(12) United States Patent
Vachette et al.

(10) Patent No.: US 6,247,650 B1
(45) Date of Patent: Jun. 19, 2001

(54) INTEGRAL IMAGE ELEMENT WITH DISPLAY CONTROL PARAMETERS

(75) Inventors: Thierry Vachette, Esbarres (FR); Gustavo R. Paz-Pujalt; Stephen Gulick, Jr., both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/217,036

(22) Filed: Dec. 21, 1998

(51) Int. Cl.[7] .................................................... G06K 19/00
(52) U.S. Cl. ....................................... 235/487; 235/462.15
(58) Field of Search ........................................ 235/454, 457, 235/487, 494, 462.01, 462.13, 462.15; 358/451, 401, 296; 359/619, 463; 355/77; 396/327, 330

(56) References Cited

U.S. PATENT DOCUMENTS

| | | |
|---|---|---|
| 1,918,705 | 7/1933 | Ives . |
| 2,039,648 | 5/1936 | Ives . |
| 2,500,511 | 3/1950 | Bonnet . |
| 3,268,238 | 8/1966 | Finkel . |
| 3,538,632 | 11/1970 | Anderson . |
| 3,751,258 | 8/1973 | Howe et al. . |
| 5,241,608 | 8/1993 | Fogel . |
| 5,276,478 | 1/1994 | Morton . |
| 5,279,912 | 1/1994 | Telfer et al. . |
| 5,349,419 | 9/1994 | Taguchi et al. . |
| 5,391,254 | 2/1995 | Morton . |
| 5,424,533 | 6/1995 | Schmutz . |
| 5,455,689 | 10/1995 | Taylor et al. . |
| 5,731,883 | * 3/1998 | Morton et al. ........................ 358/451 |
| 5,867,322 | * 2/1999 | Morton ................................ 359/619 |

FOREIGN PATENT DOCUMENTS 492186  9/1938  (GB) .

* cited by examiner

Primary Examiner—Karl D. Frech
(74) Attorney, Agent, or Firm—William F. Noval

(57) ABSTRACT

An integral image element includes at least one display control parameter that is stored in a storage mechanism located in a data code field of the integral image element. The display control parameter is read by an information reading device of a dynamic display unit that controls the display of the integral image element based on the display control parameter. The display control parameter or parameters stored on the integral image element may include a frame rate parameter, a sound parameter, a scent parameter and an illumination parameter.

9 Claims, 6 Drawing Sheets

INTEGRAL IMAGE ELEMENT WITH DISPLAY CONTROL PARAMETERS

FIELD OF THE INVENTION

The invention relates in general to integral image elements. More specifically, the invention relates to integral image elements, composed of interleaved lines from two-dimensional embedded images to create three-dimensional perspective, depth or motion effects, that includes display control parameters. A dynamic display unit displays the embedded images in a sequenced manner according to display control parameters provided on the integral image element.

BACKGROUND OF THE INVENTION

Integral image elements which align a lenticular or fly's eye lens sheet with a two dimensional image to create a three dimensional effect are known. A lenticular lens sheet has a plurality of narrow, parallel, elongated and partially cylindrical lenses, and a "fly's eye" lens sheet has a plurality of small lenses arranged in rows and columns on the sheet. Such imaging elements and their construction, are described in "Three-Dimensional Imaging Techniques" by Takanori Okoshi, Academic Press, Inc., New York, 1976. Integral image elements having a lenticular lens sheet are also described in the following U.S. Pat. Nos. 5,391,254; 5,424,533; 5,241,608; 5,455,689; 5,276,478; 5,391,254; and 5,424,533. Use of barrier viewing sheets having alternating opaque and transparent lines, instead of a lenticular lens sheet, is also well known.

Integral image elements with lenticular lens sheets use interlaced vertical image slices, which are aligned with the lenticules, so that a three-dimensional image is viewable when the lenticules are vertically oriented with respect to a viewer's eyes. Similar integral image elements, such as described in U.S. Pat. Nos. 3,268,238 and U.S. 3,538,632, can be used to convey a number of individual two-dimensional scenes such as unrelated scenes or a sequence of scenes depicting motion. Such elements, when tilted through a range of angles with respect to a viewer's eyes, can display unrelated images or a sequence of images depicting motion.

Integral image elements using reflective layers behind the integral image to enhance viewing of the integral image by reflected light, are also described in U.S. Pat. Nos. 3,751,258; 2,500,511; 2,039,648, U.S. 1,918,705 and GB 492,186.

Typically to assemble a lenticular integral image element, an original negative is exposed from stored digitized data of a composite lenticular image on a film writer. A suitable negative exposure technique is disclosed in U.S. Pat. No. 5,276,478. After photographic processing, the negative is printed, typically by a projection enlarger, onto a suitable film or paper based photographic print stock. After processing, the lenticular composite print is coated with adhesive, aligned with a lenticular lens sheet, and pressed against the lens sheet to permanently adhere to it in proper registration with the printed lenticular composite image. It is also known to write the lenticular image directly on the a back side of a lenticular lens sheet which is coated with a suitable receiving layer, as disclosed in U.S. Pat. No. 5,349,419 and U.S. 5,279,912. The lenticular image may be temporary, as in a display produced on a cathode ray tube (CRT) or liquid crystal display (LCD) screen on the back side of a lenticular lens sheet.

One difficulty with lenticular images occurs when the observer tries to display a series of images embedded in an integral image at an appropriate frame rate. This becomes obvious in the case of a motion sequence. In order to get a good motion rendering, the lenticular image has to be tilted by the observer at the original frame rate, so that the images are not displayed too slowly nor too fast.

The problem becomes even more critical in the case of an integral image display, containing a series of images to be viewed at different frame rates. In this case, the frame sampling of the motion sequence was not done on a continuous basis but according to the action content of the scene. When rapid action takes place in the scene, the frame sampling rate is increased.

Thus, it is an object of the invention to provide a mechanism that can be used to automatically control and vary the speed of the motion of the integral image element to display the embedded images at an appropriate frame rate and to provide automatic control of other preferred display parameters.

SUMMARY OF THE INVENTION

The present invention provides an integral image element that includes an integral image and at least one display control parameter associated with said integral image. The display control parameter is preferable stored in a data code field utilizing a data storage mechanism located within the data code field. The data storage mechanism may include a bar code, an electronic memory device or any other mechanism for storing analog encoded data or digital encoded data. Examples of the display control parameters that may be utilized include a frame rate parameter, an illumination parameter, a sound parameter and a scent parameter.

A dynamic display unit is provided for displaying the integral image element that includes a cradle for holding an integral image element for viewing, an information reading mechanism for reading at least one display control parameter stored on the integral image element, and a control mechanism for controlling the display of the integral image element according to the display control parameter. The control mechanism may include a mechanism for moving the integral image element about an axis of rotation or an illumination source that illuminates the integral image element and a control circuit that controls the operation of the illumination source in accordance with the display control parameter.

Other objects and advantages of the invention will become apparent from the following detailed description of the preferred embodiments of the invention and the accompanying drawings.

BRIEF DESCRIPTION OF THE DRAWINGS

The invention will now be described with reference to certain preferred embodiments thereof and the accompanying drawings, wherein.

DETAILED DESCRIPTION OF THE PREFERRED EMBODIMENTS

Figure 1:
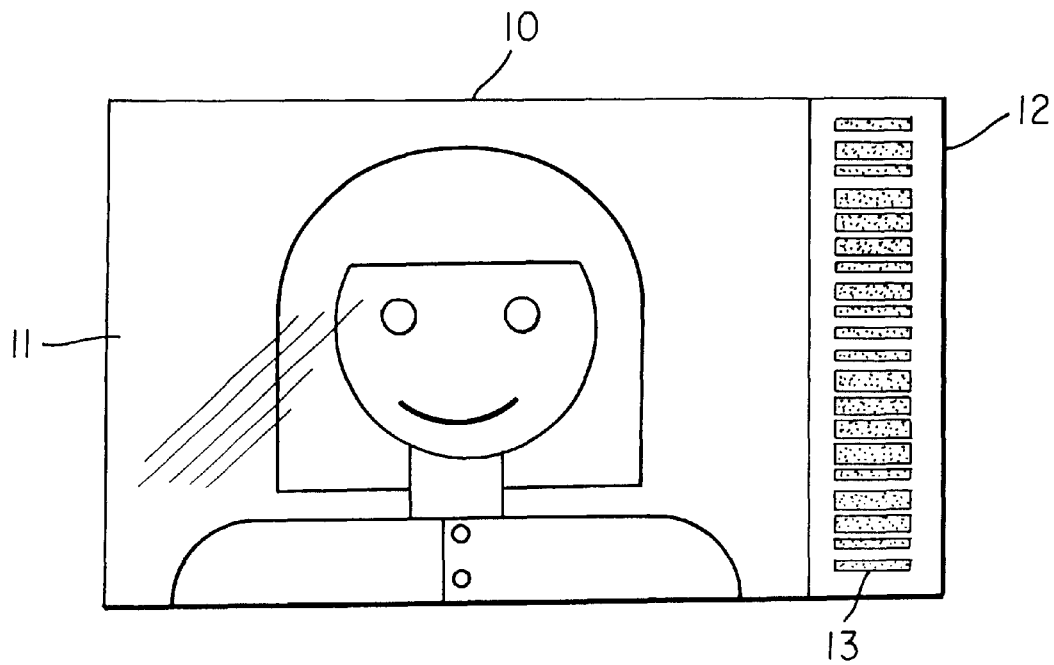
FIG. 1 is front view of an integral image element in accordance with the invention that includes a data code field and a data storage mechanism.

FIG. 1 illustrates an integral image element 10 in accordance with the invention that includes an integral image 11, a data code field 12, and a data storage mechanism 13. The integral image 11 is an image composed of segments such as interleaved lines. In the case of a lenticular image, the image segments are provided from one or more complete images. The segments are aligned with respective individual lenses of an integral lens sheet so that each of the one or more images is viewable when the user's eyes are at the correct angle relative to the imaging element.

The integral lens sheet may be a continuous web of any type of integral element lens sheet. The preferred embodiment for an integral lens sheet is a lenticular lens sheet with lenticules on the front surface, and the corresponding image used with the sheet is a lenticular image. The integral lens sheet may also be a fly's eye lens sheet, having lenses arranged in rows and column all over the sheet. Alternatively the integral lens sheet may have regions of varying indices of refraction through its volume configured to provide the same optical deflection of light rays as would be provided by a conventional fly's eye or lenticular lens sheet, in conjunction with the surfaces of the sheet, such as a curved external surface, a flat external surface, or some other shape. Furthermore, the back surface of the lens sheet may be curved either to strengthen the lens effect or to compensate for curved focal plane inherent in the lens construction. Consequently, the curvature on the back side may be shaped to match the curvature of the focal plane of the lens.

In the preferred embodiment, the receiving medium on which the integral image 11 is printed is the back side of the integral lens sheet. In a conventional integral lens sheet the back side is smooth and on the opposite side of the shaped lens surfaces, such as semi-cylindrical shaped lens surfaces of a lenticular lens sheet. Alternatively, the image receiving medium could be one or more layers coated onto the back side, such as a photosensitive layer or layers. A transparent substrate may be adhered to a lenticular lens sheet. The transparent substrate bears one or more photographic layers or other writeable image bearing layer using thermal, ink jet electro photographic, silk screen, lithography, flexography, gravure methods, or the transparent base of a conventional photographic film. The transparent substrate may then be considered part of a completed lenticular lens sheet, because the photographic layers are part of the back side of the completed lenticular lens sheet. The lenticular image may be temporary, as in a display produced on a cathode ray tube (CRT) or liquid crystal display (LCD) screen on the back side of a lenticular lens sheet.

Additionally, the image receiving medium on the back side, can be covered with a protective layer either before or after writing the image. When a protective cover layer is in place before writing the image, the protective layer can be transparent so that writing can be done by a light beam illuminating photosensitive layers on the back side.

The present invention can be applied to integral images 11, particularly lenticular images, to exhibit a wide range of effects including three dimensional perspective, motion, depth flip between apparently unrelated images, and other lenticular related effects. A perspective sequence or a depth image is a sequence of two or more images in an integral image 11 which are views of a scene taken from different angular positions to provide a three dimensional effect when viewed through the integral lens sheet. If at least three different perspective images are used, this can include the ability to look around an object in the scene. A motion sequence is a sequence of two or more images each image having at least one scene element in common but which changes location, shape or size within the scene in a sequential manner through the scene. Motion image sequences for lenticular images are generally two dimensional images but can be made from perspective sequences. A two-dimensional image is an image which, when aligned and viewed through an integral lens, does not have any viewable depth element. Thus, it does not appear three dimensional and the viewer cannot look around it at all. A scene element in this regard, is the same view of the same object including the object appearing to be the same size.

Figure 2:
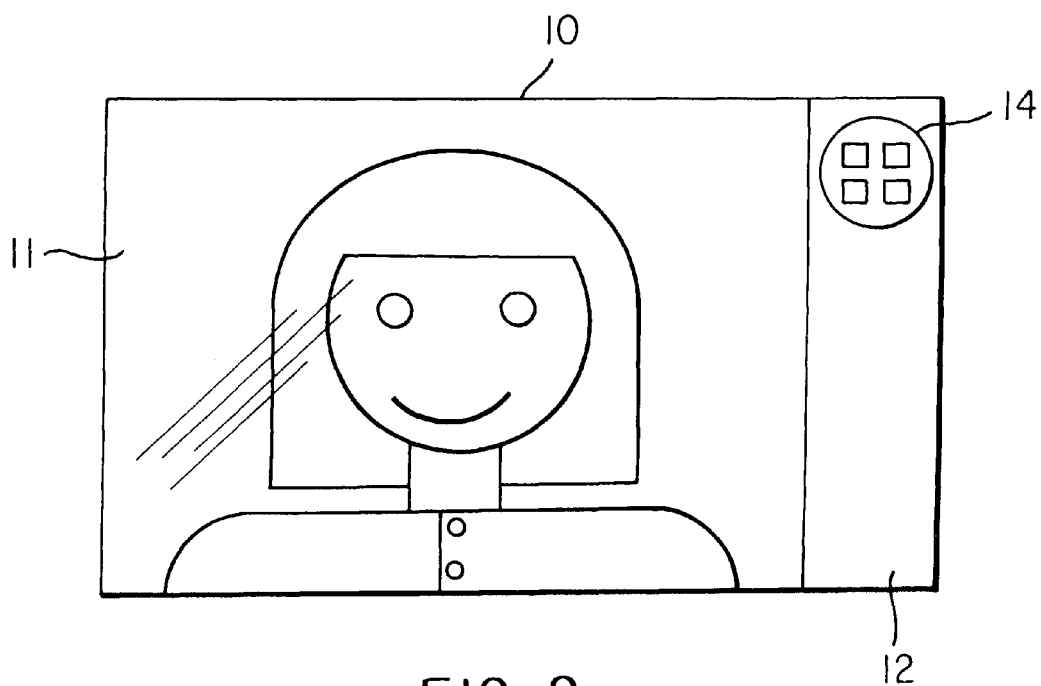
FIG. 2 is a front view of an integral image element including a data code field located on the side, wherein the data storage mechanism is an electronic chip.

The data code field 12 is an area on the integral image element 10 dedicated to storage of display control parameters that correspond to the integral image 11 using a data storage mechanism 13. The display control parameters are either generated at the time of production of the integral image 11, or are generated at a later time in accordance with a preferred display option. In the embodiment illustrated in FIG. 1, the data storage mechanism 13 is a bar code label that is located within the data code field 12. Other forms of data storage mechanisms, however, may be readily employed. For example, as shown in FIG. 2, the data storage mechanism 13 is an electronic memory device or "chip" 14 that is located within the defined data code field 12. Still further, any type of mechanism for storing either analog data or digital data may be employed including, but limited to, a magnetic particle stripe, an electric connection having a given resistance accounting for an analog data value, a mechanical feature such as a series of notches, a given pattern of indentation or land and pit configurations such as in a CD-optical recording or other optical encoding such as the use of density patterns.

Figure 3A:
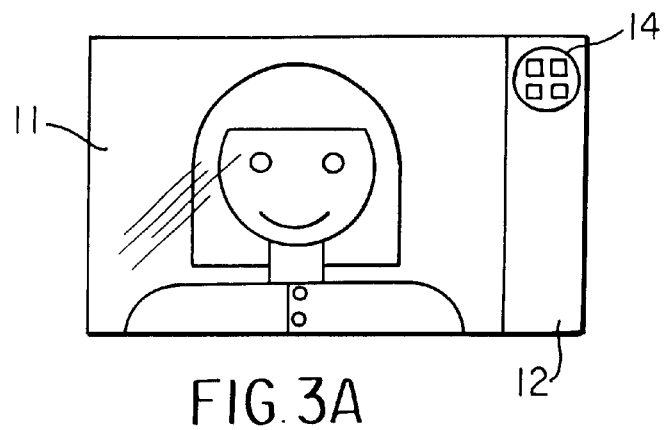
FIG. 3A is a front view of an integral image element including a data code field on the right hand side, wherein the data storage mechanism is an electronic chip.
Figure 3B:
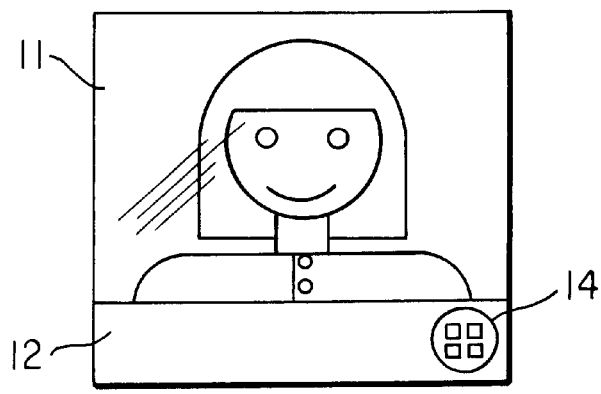
FIG. 3B is a front view of an integral image element including a data code field on the bottom, wherein the data storage mechanism is an electronic chip.
Figure 3C:
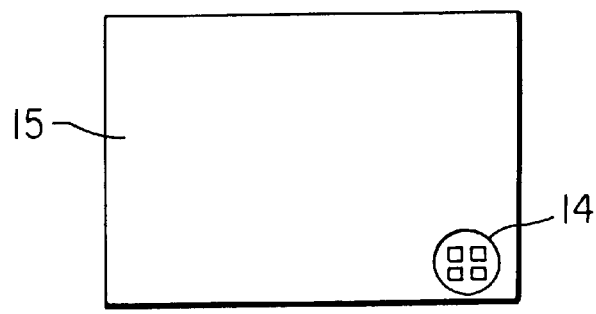
FIG. 3C is a back view of an integral image element including a data code field on the back, wherein the data storage mechanism is an electronic chip.

The data code field 12 can be placed on various areas of the integral image element. FIGS. 3A. 3B and 3C, for example, illustrate the various arrangements of the data code field 12 and the memory device 14. In FIG. 3A, the data code field 12 is shown beside the integral image 11. FIG. 3B illustrates the data code field 12 as being located below the integral image 11. In FIG. 3C the memory device 14, is situated on the back side 15 of the integral image 11 in any preferred location. In these examples, the information contained in the data storage mechanism 13 may be accessed from the front side, back side, or either side of the integral image element. The data storage mechanism 13 may also be located on the integral image 11 itself, masking part of it, and not in a separate dedicated data code field 12, i.e. the data code field 12 and the associated data storage mechanism can be incorporated as part of the integral image 11.

Figure 4:
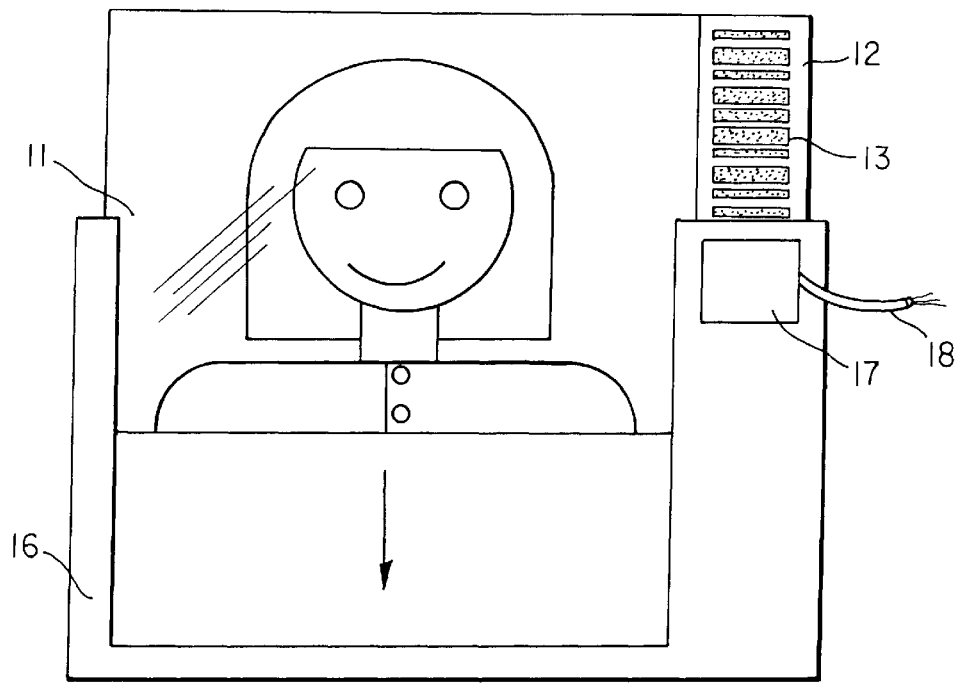
FIG. 4 is a front view of an integral image element placed half way into the cradle of a dynamic display unit, wherein the dynamic display unit has a bar code reader to read the data code field on the side of the integral image element and a data cable to transmit display control parameters.

A dynamic display unit utilizes a multiplicity of information reading devices and methods for reading the information in the data code field 12. FIG. 4, for example, illustrates a dynamic display unit 16 for an integral image element 10 including an integral image 11, a data code field 12, and a data storage mechanism 13 in the form of a bar code. The main body of the dynamic display unit 16 is formed as a cradle into which the integral image element 10 can be inserted. While the data code field 12 is masked by the side of the dynamic display unit 16, the integral image 11 itself is always visible to the observer. The dynamic display unit 16 includes an information reading device 17. In this embodiment, the information reading device 17 is a bar code reader that reads the information stored in the bar code data storage mechanism 13 as the integral image 11 is inserted into the dynamic display device 16. Alternatively, the information reading device 17 can scan the bar code after insertion of the integral image element 10. Information read by the information reading device is supplied to a control system of the dynamic display unit 16 (not shown) via a connection 18.

Figure 5:
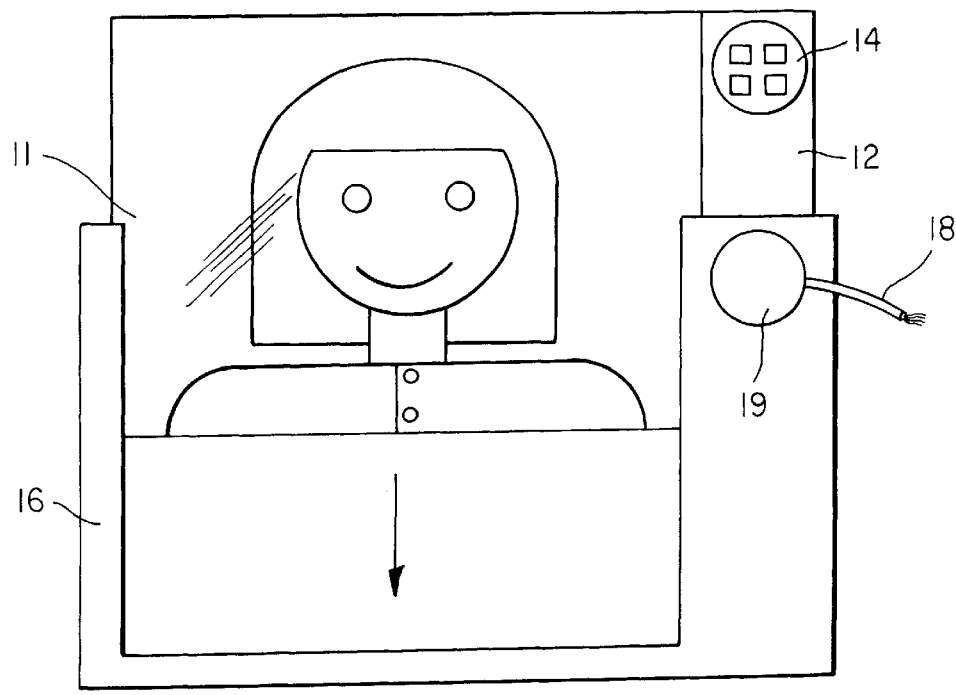
FIG. 5 is a front view of an integral image element placed half way into the cradle of a dynamic display unit, wherein the dynamic display unit has an electronic chip reader to read the data code field on the side of the integral image element and a data cable to transmit display control parameters.

FIG. 5 shows a further embodiment of a dynamic display unit 16 with a different type of information reading device 19 for reading data contained in an electronic memory device 14. In this embodiment, the information reading device 19 includes electrical contacts that make contact with corresponding electrical contacts on the electronic memory device 14. Alternatively, electromagnetic coupling, optical coupling, radio frequency coupling or some other form of wireless connection may be utilized. The information reading device 19 preferably reads data from the integral image element 10 once the integral image element 10 is fully set into the dynamic display unit 16. As in the embodiment illustrated in FIG. 4, a connection between the information reading device 19 and a control circuit is provided the connection 18.

Figure 6:
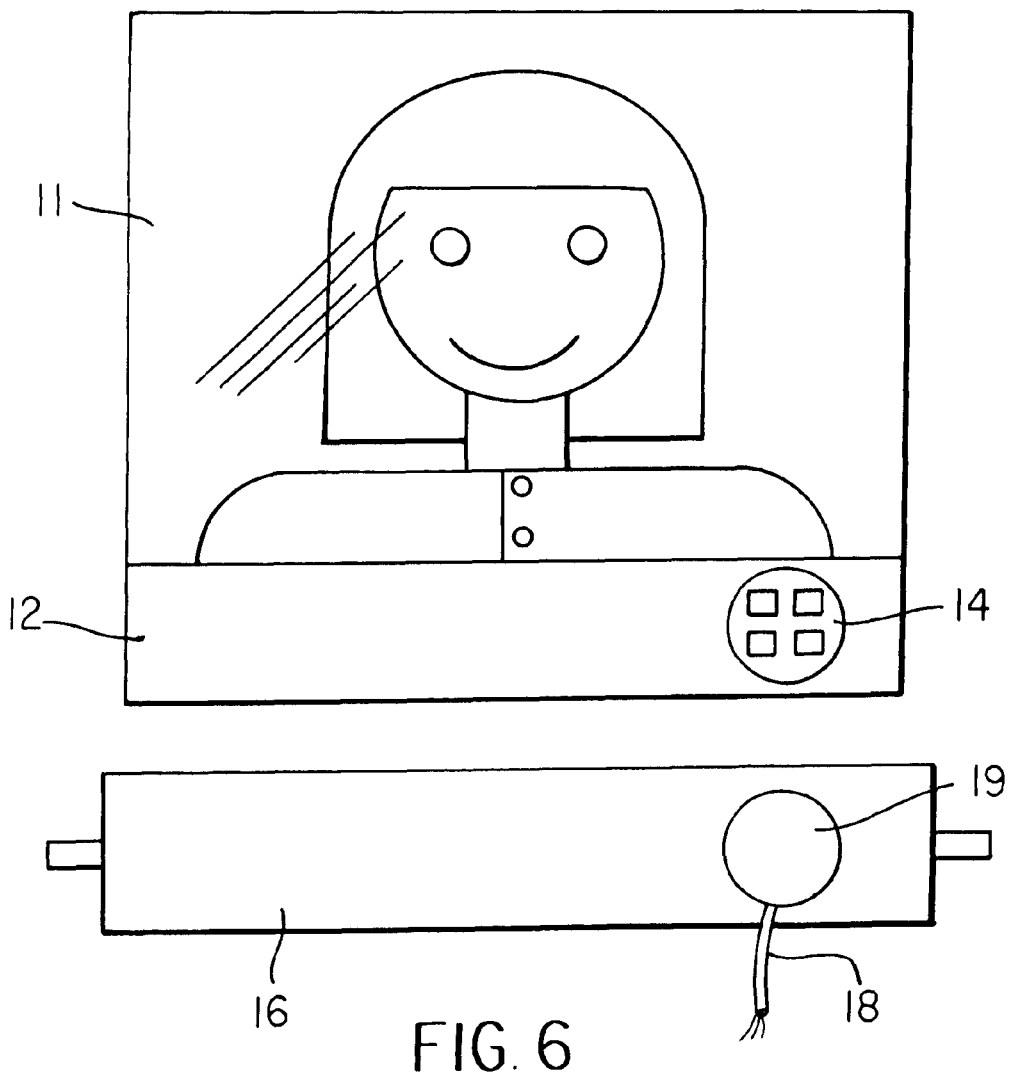
FIG. 6 is a front view of an integral image where the data code field is on the bottom and an electronic chip is in the field, wherein the cradle of a dynamic display unit has an electronic chip reader and a data cable.

FIG. 6 illustrates an example of a dynamic display unit 16 that is utilized when the data code field 12 is provided at the bottom of the integral image 11. In this example, only the data code field 12 fits into the dynamic display unit 16, and the integral image element 10 is introduced into the top of the dynamic display unit 16. Once introduced, only the integral image 11 is visible to an observer.

Figure 7A:
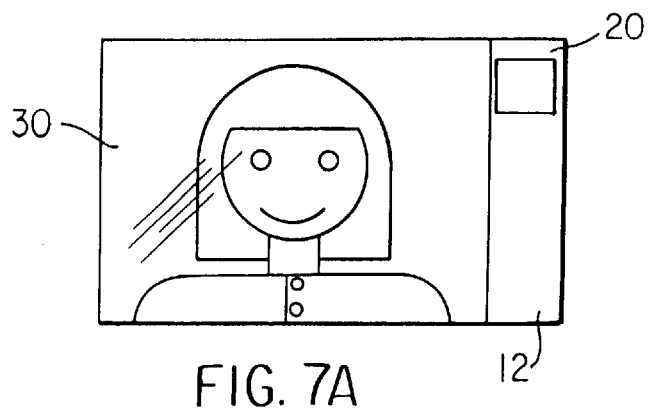
FIGS. 7A–7C is a series of three interleaved images which are all incorporated onto one integral image element, wherein the integral image element is tilted to a different angle to display each image, and wherein the data code field is located on the side, and it contains density code data for each image.
Figure 7B:
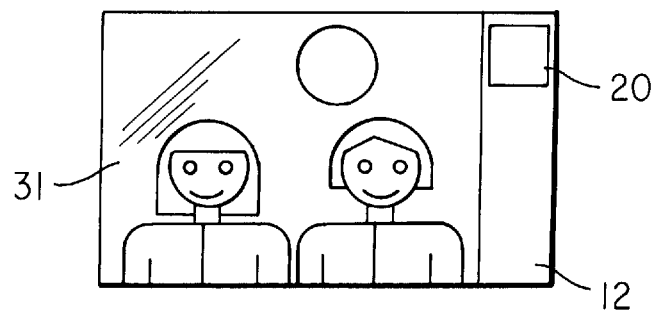
Figure 7C:
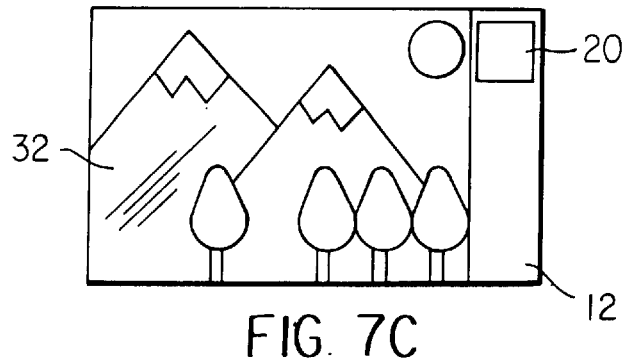

FIGS. 7a–7c illustrates how an integral image 11, more particularly a lenticular image, contains a series of typically from two to twenty interleaved embedded images 30, 31, and 32 that can be viewed independently when the lenticular image is tilted to different angles. In this embodiment, coding the desired information as analog or digital data takes advantage of the properties of the integral images 11. The data code field 12 of these images can be dedicated to the storage of information to be transmitted to the dynamic display unit 16, and this information can be either analog or digital data. For example, the data storage mechanism 20, in this case a density code field, of each of the interleaved images of the integral image 11 can be of different colors, typically black and white, in the case of a binary encoding. In such a case, the color of the data code field 12 of the first image corresponds to the first bit of data, the color of the data field 12 of the second image corresponds to the second bit of data, etc. An analog data storage system consists of data storage mechanism where the data are encoded as variable densities code fields. By reading the density of the data storage mechanism of each interleaved image, an analog value to be processed by the data processing unit of the dynamic display unit 16 can be determined. In the case of data encoded in each of the series of images of the integral image 11 itself, the reader can be a photodiode for the analog data, and a photodiode coupled to an analog-to-digital converter to generate digital data.

The data storage mechanism 13 can be of any type or can be a combination of any of the types described above. Also, one data storage mechanism can contain more than one set of data, and furthermore the various sets of data contained in the same data storage mechanism do not need to be of the same type or encode the same kind of data. In addition the various types of data encoded in the integral image element 10 can be all read by the same reader or can be read by different readers.

The invention provides a simple and convenient mechanism for providing control parameters to a dynamic display unit to overcome the problems associated with the display of integral images. One difficulty with lenticular images, for example, occurs when the observer tries to display a series of images embedded in an integral image 11 at an appropriate frame rate, particularly in the case of a motion sequence. In order to get a good motion rendering, the lenticular image 11 has to be tilted by the observer at the original frame rate, so that the images are not displayed too slowly nor too fast.

The problem becomes even more critical when displaying an integral image, containing a series of embedded images to be viewed at different frame rates. In this case, the frame sampling of the motion sequence is not done on a continuous basis but according to the action content of the scene. When rapid action takes place in the scene, the frame sampling rate is increased. Thus, it is desirable to provide a dynamic display unit that automatically controls and varies the speed of the motion of the integral image element to display the embedded images at an appropriate frame rate.

It is well known that integral image elements need to be pivoted about an axis in order to view all the embedded images. For lenticular images, a rocking motion is necessary to display all the embedded images to an observer. Thus, a display unit having a mechanism of providing this movement is highly desirable. However, depending on its contents, the integral image element has to be pivoted or rotated at varying speeds in order to provide an adequate display of different types of images. Thus, display control parameters are preferably determined according to the content of the integral image 11, and they allow the dynamic display unit to exchange display control information with the lenticular image display to determine the best way to play the integral image 11. These data can contain information on the right frame rate and overall angle of rotation to play a motion sequence, how long to display each two or three dimensional still image of a perspective sequence, or a combination of these two.

Because of their particular constructions, integral images 11 are best seen with a light source, thus this feature is highly desirable in an dynamic display unit. Control parameter data encoded into the integral image element can also be used to control the light source, for example switching off the light during half of the rocking motion of a motion sequence will prevent displaying the motion sequence in reverse order. The light may be switched off after a given duration to save either the lamp or a battery if so equipped.

The display control parameters may also be utilized to provide other advantageous features. For example, the display control parameter can define the time of day to switch on an off the dynamic display unit. In this case, the dynamic display unit preferably includes an electronic clock and a data processing unit which turns the display unit on and off as required. Still further, the synchronization of sound with the displayed image can be controlled. Most motion sequences are made from video where sound is already available. If sound is incorporated into an integral image 11, for example a tape or a sound chip, the combination of images and sound should be played according to a preferred pattern. Depending on the action which takes place in the motion sequence, the images may be sampled on an irregular basis, more images are sampled when there is intense action while less images are sampled when the action is less intense. Thus, the varying image frame rates used during sampling need to be played back during viewing. The dynamic display unit needs to coordinate the sound and image frame rate. For a series of still images embedded in an integral image 11, the process is the same there is still a need to synchronize the sound and the images. Further still, the dynamic display unit may also be equipped with one or more scent dispensers that can be activated according to the image displayed so that the observer can enjoy not only the image but also a scent that is closely related to the image content.

Figure 8:
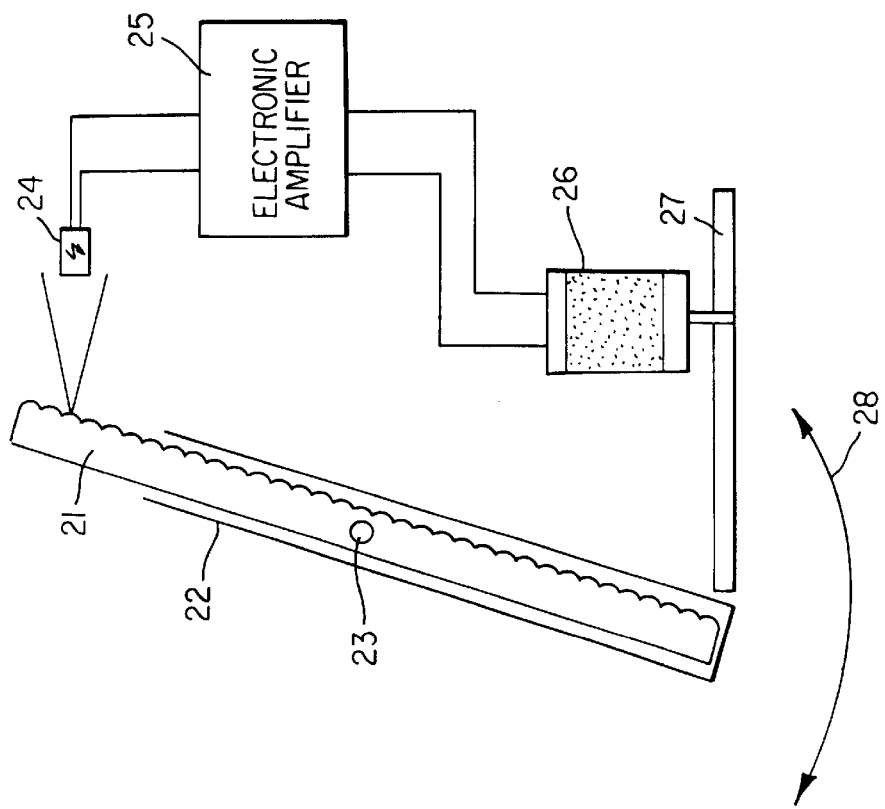
FIG. 8 is a schematic side view of a dynamic display unit for an integral image element including a cradle, a photodiode, an amplifier, a variable speed electric motor, and an aspherical gear, wherein the unit rocks the cradle around the axis of rotation to display the integral image with a rocking motion.

FIG. 8, for example, shows a schematic side view of a dynamic display unit 16 that includes a cradle 22 that rotates about an axis of rotation 23. In this example, the data storage mechanism 21 of the integral image element 10 is encoded with different for the different images, the control system of the dynamic display unit 16 includes a photodiode 24 deflects the input illumination either reflected or transmitted from a light source (not shown), reads the data storage mechanism 21, and converts it into a electronic signal. The output voltage of this electronic signal is proportional to the illumination of the photodiode 24 and thus to the density of the data storage mechanism 21. The electronic signal is then amplified through an electronic amplifier 25 to provide the input signal for a variable speed electric motor 26. The rotational speed of the motor 26 is proportional to the applied voltage. Accordingly, the motor 26 is operated accordingly to the density of the data storage means 21 of the integral image element displayed by the dynamic display unit 16 and generates a rocking motion 28 for the integral image element with an aspherical gear 27 according to the encoded frame rate.

Figure 9:
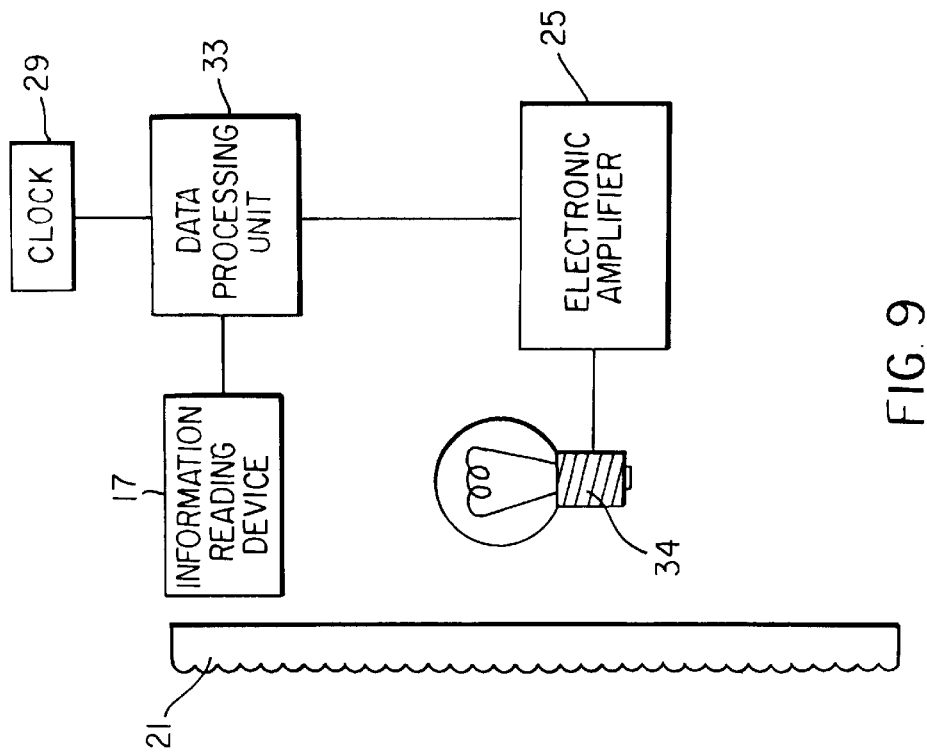
FIG. 9 is a schematic side view of a dynamic display unit for an integral image element including a bar code reader, an electronic clock, a data processing unit, an amplifier, and an illumination system, wherein the electronic clock drives the back light illumination system according to the instructions encoded into the data code field.

A further example is illustrated in FIG. 9, which shows a schematic side view of a dynamic display unit 16 with an illumination system 34. In this case, the data storage mechanism 21 is a bar code, which triggers a light saver feature on the dynamic display unit 16, and the information reading device 17 is a bar code reader. The number read off of the bar code 21 is transferred to a data processing unit 33 which stores it in an appropriate register. The register is then automatically decreased by one unit using a clock signal supplied by an electronic clock 29. After each cycle, the register is checked to see if it is equal to zero. If it is not equal to zero, the process continues, and when it becomes equal to zero the process is stopped and the output signal is turned off. This output signal is connected to an electronic amplifier 25 which is connected to the illumination system 34. The number encoded onto the bar code is the number of cycles after which the light saver has to be enabled.

The invention has been described with reference to certain preferred embodiments thereof. It will be understood, however, that modifications and variations are possible with the scope of the appended claims.

PARTS LIST

10 Integral Image Element
11 Integral Image
12 Data Code Field
13 Data Storage Mechanism
14 Memory Device
15 Back Side
16 Dynamic Display Unit
17 Information Reading Device
18 Connect
19 Information Reading Device
20 Data Storage Mechanism
21 Data Storage Mechanism
22 Cradle
23 Axis of Rotation
24 Photodiode
25 Electronic Amplifier
26 Motor
27 Aspherical Gear
28 Rocking Motion
29 Electronic Clock
30 Embedded Image
31 Embedded Image
32 Embedded Image
33 Data Processing Unit
34 Illumination System

What is claimed is:

1. A method of controlling the display of a sequence of images embedded in an integral image element comprising the steps of:

generating a display control parameter corresponding to an integral image of the integral image element;

storing the display control parameter with a data storage mechanism located within a data code field of the integral image element; and utilizing a dynamic display unit to read the display control parameter from the data storage mechanism and control the display the integral image element based on the display control parameter.

2. The method claimed in claim 1, wherein the display control parameter comprises at least one of a frame rate parameter, an illumination parameter, a sound parameter and a scent parameter.

3. A dynamic display unit comprising:

a cradle for holding an integral image element for viewing;

information reading means for reading at least one display control parameter stored on the integral image element; and control means for controlling the display of the integral image element according to the display control parameter.

4. A dynamic display unit as claimed in claim 3, wherein the control means includes means for moving the integral image element about an axis of rotation.

5. A dynamic display unit as claimed in claim 4, wherein the means for moving integral image element includes a variable speed motor.

6. A dynamic display unit as claimed in claim 3, wherein the control means includes an illumination source that illuminates the integral image element and a control circuit that controls the operation of the integral image element in accordance with the display control parameter.

7. A dynamic display unit as claimed in claim 3, wherein the integral image element includes an integral image, a data code field and a data storage mechanism located within the data code field.

8. A dynamic display unit as claimed in claim 7, wherein the data storage mechanism comprises a bar code and the information reading means comprises a bar code reader.

9. A dynamic display unit as claimed in claim 7, wherein the data storage mechanism comprises an electronic memory device.

* * * * *